United States Patent [19]

Copeland, III

[11] Patent Number: 4,782,498
[45] Date of Patent: Nov. 1, 1988

[54] MODEM WITH IMPROVED HANDSHAKING CAPABILITY

[75] Inventor: John A. Copeland, III, Dunwoody, Ga.

[73] Assignee: Hayes Microcomputer Products, Inc., Norcross, Ga.

[21] Appl. No.: 901,134

[22] Filed: Aug. 28, 1986

[51] Int. Cl.$^4$ .............................................. H04B 1/38
[52] U.S. Cl. ........................................ 375/8; 375/121; 370/24
[58] Field of Search ............... 375/7, 8, 121; 364/900, 364/200; 379/98, 97, 93; 370/24, 41, 43, 84

[56] References Cited

U.S. PATENT DOCUMENTS

| | | | |
|---|---|---|---|
| 4,000,371 | 12/1976 | Ogawa | 379/98 |
| 4,215,243 | 7/1980 | Maxwell | 379/98 |
| 4,387,440 | 6/1983 | Eaton | 364/900 |
| 4,549,302 | 10/1985 | Heatherington | 375/8 |
| 4,620,294 | 10/1986 | Leung et al. | 364/900 |
| 4,680,773 | 7/1987 | Amundson | 375/8 |
| 4,680,781 | 7/1987 | Amundson et al. | 375/121 |

OTHER PUBLICATIONS

CCITT Recommendation v. 22 Bis; 1984; "2400 Bits Per Second Modem . . .".

Primary Examiner—Robert L. Griffin
Assistant Examiner—Stephen Chin
Attorney, Agent, or Firm—Jones, Askew & Lunsford

[57] ABSTRACT

The preferred embodiment (11) of the modem comprises a control unit (13), a memory (27), a switch (14), and a modem engine (17). The modem engine (17) establishes communications with a modem (30) using conventional handshake methods. The control unit (13) then initiates a special handshake sequence composed of nonprintable, opposing characters to the modem (30) via the switch (14) and the modem engine (17). If the modem (30) completes the special handshake sequence then the control unit (13) and the modem (30) exchange the desired information. If the modem (30) does not complete the special handshake sequence then the preferred embodiment (11) functions as a conventional modem. The use of nonprinting, opposing characters for the special handshake sequence prevents the special handshake sequence from adversely affecting the external devices (10) (34).

33 Claims, 1 Drawing Sheet

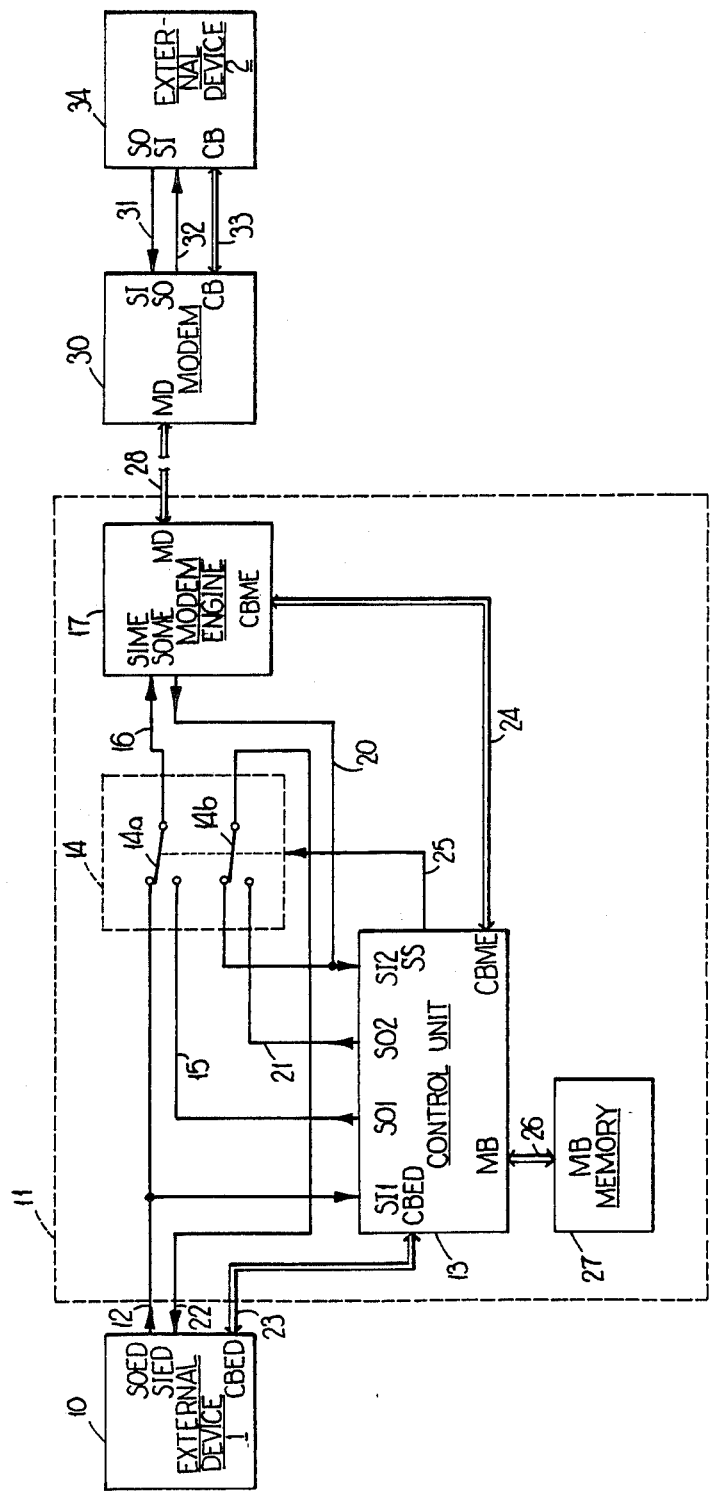

MODEM WITH IMPROVED HANDSHAKING CAPABILITY

TECHNICAL FIELD

The present invention relates to digital modulator-demodulators (modems) and particularly discloses an inmproved modem with an improved, nonprinting, handshake capability.

BACKGROUND OF THE INVENTION

A modem (modulator-demodulator) is a data communications device which allows communication between digital computing machines over voice-grade telephone lines. Typically, in order to establish the communication, one modem, the originating modem, dials the telephone number of the location where another modem, the answering modem, is located. The answering modem detects the ringing signals on the telephone line and seizes the telephone line.

A first handshake procedure then follows. The answering modem places an answer tone on the telephone line or, if selected by the user, remains silent. The originating modem detects the answer tone, or silence, and places the originating data carrier on the telephone line. The answering modem detects the originating data carrier, removes the answer tone and places the answering data carrier on the telephone line. At the end of this first handshake procedure the two digital computing machines may begin exchanging data (log-on, procedures, identification codes, document transfer, etc.). This, of course, assumes that the two modems were programmed for the same speed (baud rate), mode (synchronous or asynchronous), and operating format (number of data bits, presence and nature of parity bits, type of synchronous format, etc.). If the speed, mode, and format do not match, then the data cannot be exchanged.

Some, more advanced, modems perform a second handshake procedure to select the proper speed. Typically, the originating modem starts at the highest speed for which it is capable. The answering modem determines this speed and, if possible, starts at this speed. If the answering modem cannot attain this speed, the answering modem starts at the highest speed for which it is capable. The originating modem determines the speed of the answering modem and, if different from its own speed, adjusts its speed downward to match that of the answering modem.

Also, many systems, in order to prevent unauthorized access, have a third handshake procedure, known as a logon procedure. A typical logon procedure requires the transfer of one or more identification numbers, access codes, etc. Some of the advanced modems can be programmed to perform this third handshaking procedure, which is a great convenience to the user.

While the above handshake procedures work well, they are limited in function and do not allow the modems to exchange other data which is useful, such as the type of device, modes supported, formats supported, signal quality, etc. It is, of course, within the state of the art to design a modem which can provide and act on this information. However, two problems arise.

First, the information must be transferred in a manner which does not cause this information to appear at the digital computing machines or interfere with the above handshake procedures. It is, of course, a simple matter to design a modem which initially blocks data transfer to and from the digital computing machine so that this information is not provided to the digital computing machine, and which transfers this information at a time which will not interfere with the above handshake procedures.

However, when a first modem which can perform such information transfer is connected to a second modem, the first modem must determine whether or not the second modem can perform such information transfer. Therefore, a fourth handshake procedure is required. However, this fourth handshake procedure will be passed on to the digital computing machine if the second modem is a standard modem which cannot perform such information transfer. Therefore, the second problem is providing a fourth handshake procedure which, when passed to the digital computing machine, does not affect the digital computing machine, or cause this fourth handshake procedure to be displayed.

There is therefore a need for a handshaking procedure which, when provided to a modem which is not equipped for said handshake procedure, does not adversely affect the modem, the digital equipment connected to the modem, or the standard handshake procedures.

There is also a need for a modem, with an improved handshake capability, which can communicate with modems which do not have said improved handshake capability.

There is also a need for a modem, with an improved handshake capability, which can exchange data with another modem with said improved handshake capability while preventing said data from being provided to digital computing machines connected to said modems.

SUMMARY OF THE INVENTION

The present invention provides such an improved modem.

The present invention also provides such an improved handshake procedure.

Broadly stated, the present invention provides a modem which, in a first mode, passes incoming data to an external device, and which, in response to a predetermined sequence of predetermined characters, enters a second mode in which incoming data is not passed to the external device.

More particularly stated, the present invention provides a modem which, in the call answer mode, answers an incoming call, completes one or more preliminary handshake procedures, and institutes a special handshake procedure. If the special handshake procedure is completed by the calling modem then the preferred embodiment switches from the call answer mode to the modem data exchange mode wherein data is transferred between the modems but is not provided to external devices connected to the modems. This allows the modems to exchange data such as device type, modes supported, speeds supported, signal quality conditions, etc., while preventing the data from affecting external devices connected to the modems. If however, the special handshake procedure is not completed by the calling modem, then the preferred embodiment functions as a conventional modem and passes data to/from any external device connected to it.

Also more particularly stated, the present invention provides a modem which, in the call originate mode, places outgoing calls, completes one or more preliminary handshake procedures, and looks for the first part of the special handshake procedure. If the answering modem provides the first part of the special handshake procedure, then the preferred embodiment completes the special handshake procedure and switches from the call originate mode to the above-mentioned modem data exchange mode. If, however, the first part of the special handshake procedure is not provided by the answering modem, then the preferred embodiment functions as a conventional modem and passes data to/from any external device connected to it.

Also more particularly stated, the present invention provides a special handshake procedure comprising opposing, nonprintable characters such as space, backspace, and null. The use of nonprintable characters such as space, backspace, and null allows the special handshake procedure to be passed through a modem to, for example, a data terminal connected to a printer. Since space, backspace, and null are nonprintable characters, the printer will not print them. Also, since space and backspace are opposing characters, the printer carriage will be at the same position after the end of the special handshake procedure as it was before the beginning of the special handshake procedure if each space in the sequence is eventually followed by a corresponding backspace. The space does not need to be immediately followed by the corresponding backspace. The null character causes no effect. Therefore, since the characters are nonprintable and opposing, the special handshake procedure is essentially transparent.

Therefore, it is an object of the present invention to provide a transparent handshake procedure.

It is another object of the present invention to provide a modem, responsive to the transparent handshake procedure, which can exchange data with a similar modem without adversely affecting digital equipment connected to the modems or adversely affecting the standard handshake procedures.

It is another object of the present invention to provide a modem, responsive to the transparent handshake procedure, which is compatible with conventional modems.

It is a further object of the present invention to provide a modem which can exchange data with a similar modem without adversely affecting digital equipment connected to the modems or adversely affecting the standard handshake procedure.

That the present invention accomplishes these objects will be made clear by the following detailed description of the preferred embodiment.

BRIEF DESCRIPTION OF THE DRAWINGS

The drawing is a block diagram of the preferred embodiment of the present invention in its preferred environment.

DETAILED DESCRIPTION

Turning now to the drawing, which is a block diagram of the preferred embodiment of the present invention in its preferred environment, the preferred embodiment of the present invention will be described. The preferred embodiment 11 comprises a control unit 13, a switch 14, a modem engine 17, and a memory 27.

External device 10 is typically a digital computer but may, of course, be any device which sends and/or receives digital data. The serial data output (SOED) of external device 10 is connected by conductor 12 to the normally-closed contact of section 14a of switch 14 and a first serial data input (SI1) of control unit 13. A first serial data output (SO1) of control unit 13 is connected by conductor 15 to the normally-open contact of section 14a of switch 14. The center contact of section 14a of switch 14 is connected by conductor 16 to the serial data input (SIME) of modem engine 17. The serial data output (SOME) of modem engine 17 is connected by conductor 20 to the normally-closed contact of section 14b of switch 14 and to a second serial data input (SI2) of control unit 13. The second serial data output (SO2) of control unit 13 is connected by conductor 21 to the normally-open contact of section 14b of switch 14. The center contact of section 14b of switch 14 is connected by conductor 22 to the serial data input (SIED) of external device 10.

It will be appreciated from the above that control unit 13 is always connected to the SOED output of external device 10 and the SOME output of modem engine 17. It will also be appreciated that switch 14 controls whether the SOED output of external device 10 or the SO1 output of control unit 13 is connected to the SIME input of modem engine 17, and whether the SOME output of modem engine 17 or the SO2 output of control unit 13 is connected to the SIED input of external device 10.

The switch select (SS) output of control unit 13 is connected by conductor 25 to the switch select (SS) input of switch 14. Therefore, when the SS output of control unit 13 is in a first state, for example, a logic 0, the SOED output of external device 10 is connected to the SIME input of modem engine 17, and the SOME output of modem engine 17 is connected to the SIED input of external device 10. This first state therefore allows external device 10 to exchange data through modem engine 17.

When the SS output of control unit 13 is in a second, opposite state, for example, a logic 1, the SO1 output of control unit 13 is connected to the SIME input of modem engine 17 and the SO2 output of control unit 13 is connected to the SIED input of external device 10. This second state therefore allows control unit 13 to exchange data through modem engine 17, and allows control unit 13, if desired, to exchange data with external device 10.

It will be appreciated that switch 14 may be a relay, a combination of transmission gates, a combination of AND-OR gates, or other devices.

The control bus port (CBED) of external device 10 is connected by control bus 23 to the control bus port (CBED) of control unit 13. Control bus 23 carries control signals between external device 10 and control unit 13. Such control signals may be, for example, data transfer clocks, data terminal ready, data set ready, ready-to-send, etc. The particular control signals carried by bus 23 will, of course, depend on the control signals required and provided by external device 10.

The control bus port (CBME) of modem engine 17 is connected by control bus 24 to the control bus port (CBME) of control unit 13. Control bus 24 carries control signals between modem engine 17 and control unit 13. Such control signals may be, for example, data carrier detect, ring indicator, data transfer clock, modem engine baud rate, etc. The particular control signals carried by bus 24 will, of course, depend upon the control signals required and provided by modem engine 17.

In the preferred embodiment, modem engine 17 comprises data modulator and demodulator circuits, telephone line interface coupling, isolation and protection devices, etc. Means of construction of modem engine 17 and means of controlling the operation of modem engine 17 by a control unit, such as control unit 13, are well known to those skilled in the art.

The memory bus port (MB) of control unit 17 is connected by memory bus 26 to the memory bus port (MB) of memory 27. Memory 27 comprises a read only memory (ROM), a random access memory (RAM), and, preferably, an electrically erasable programmable read only memory ($E^2PROM$). The ROM of memory 27 contains operating instructions and default operating parameters. The RAM of memory 27 contains temporary data and selected operating parameters. The $E^2$-PROM of memory 27 provides for the nonvolatile storage of certain data and operating parameters when power is removed from the preferred embodiment 11. Means of construction of memory 27 and means of controlling operation of memory 27 by control unit 13 are well known to those skilled in the art. U.S. patent application No. 792,520 entitled "Improved Modem Controller" by Jeffrey Inskeep and George R. Thomas, also discloses means of construction of memory 27 and means of controlling the operation of memory 27 by control unit 13, and is hereby incorporated herein by reference.

Control unit 13 comprises a microprocessor, logic devices, address latches, buffers, etc. The architecture and design of control unit 13 will depend upon the control bus requirements of the particular external device 10, the particular modem engine 17, and the particular devices used for memory 27. Means of construction and programming of control unit 13 will be apparent to one skilled in the art from the disclosure herein and the general state of the art. Also, although switch 14 is shown as a separate component for clarity, it will be appreciated that the switching function of switch 14 can also easily be performed by the microprocessor of control unit 13.

The modulated data input/output port (MD) of modem engine 17 is connected to one end of a telephone line 28. It will be understood that telephone line 28 is connected to the telephone company central office switch, branch exchange switches, relay tower, etc. The other end of telephone line 28 is connected to the modulated data input/output port (MD) of a modem 30. The serial input (SI) of modem 30 is connected by conductor 31 to the serial output (SO) of external device 2 (ED2) 34. The serial output (SO) of modem 30 is connected by conductor 32 to the serial input (SI) of external device 34. The control bus port (CB) of modem 30 is connected by bus 33 to the control bus port (CB) of external device 34. It will be appreciated that external device 34 and modem 30 are the equipment connected at the other end of telephone line 28.

Assume now that modem 30 is a standard modem and that modem 30 and external device 34 are the originating station. Modem engine 17 detects, in a well known manner, the ringing signals on telephone line 28 and sends a ring indicator signal to control unit 13 over CBME bus 24. Control unit 13, in response to the ring indicator signal, commands modem engine 17, via CBME bus 24, to answer (go off-hook) telephone line 28, places a logic 1 onto SS conductor 25, and sends, via its SO1 output, a predetermined sequence of characters to modem engine 17, for example, 100 repetitions of the sequence space-backspace. Modem engine 17 places the predetermined sequence of characters, in modulated form, onto telephone line 28. Modem 30 receives this predetermined sequence of characters in modulated form, demodulates them, and sends them to external device 34 via conductor 32. External device 34 then displays (or prints) these characters.

It is desirable to prevent these two characters from being displayed. Therefore, the two characters are preferably a sequence of pairs of opposing, nonprintable characters and null characters. Opposing, in the sense that the second character of each pair counteracts the action of the first character, and nonprintable in the sense that these two characters are not normally printed or displayed. One example of two opposing, nonprintable characters are "space", and "backspace". Null characters normally have no effect on printers or CRT displays.

The sequence of opposing, nonprintable characters and null characters is a first part of a handshake sequence. Therefore, after control unit 13 has sent these characters control unit 13 begins monitoring the SDME output of modem engine 17 for the next part of the handshake sequence. The next part of the handshake sequence should also comprise opposing, nonprintable characters and null characters, which may be the same characters as for the first part of the handshake sequence, i.e., space and backspace, or a different sequence, such as 66 repetitions of the sequence space-null-backspace. The use of different sequences for the first part and the second part has the advantage of preventing an erroneous determination when modem 30 is in the "echo" (loop-back) mode.

However, since modem 30 is a standard modem it will not execute the next part of the handshake sequence. Therefore, the first data that modem 30 places on telephone line 28 will typically be something other than the handshake sequence characters.

Control unit 13 stores, in memory 27, the response of modem 30 to the first part of the handshake sequence. Control unit 13 analyzes the response from modem 30 and, if the modem 30 response is not the second part of the handshake sequence, then control unit 13 reads the modem 30 response from memory 27, sends the modem 30 response to external device 10 via switch 14, and then places a logic 0 onto SS conductor 25, thereby connecting external device 10 to modem engine 17. Also, if there is no response from modem 30 within a predetermined period of time T1, then control unit 13 places a logic 0 onto SS conductor 25. Control unit 13 then monitors the SOED output of external device 10 and the SOME output of modem 17 for an escape sequence, and allows external device 10 to exchange data with modem engine 17 in a conventional manner.

However, assume now that modem 30 is a modem such as the preferred embodiment 11. In this case, when modem 30 originates the call, it will disconnect external device 34 in the same manner that control unit 13 disconnects external device 10 from modem engine 17 via switch 14. Then, when modem 30 receives the first part of the handshake sequence, modem 30 will then send the second part of the handshake sequence over telephone line 28.

Since both modem 11 and modem 30 have placed a logic 1 onto their respective SS conductor 25, external device 10 and external device 34 are disconnected. At this point, control unit 13 of the preferred embodiment 11 can exchange data with the corresponding control unit in modem 30 and this data will not appear at external device 10 or external device 34. This data may be any desired information, such as maximum bit rate, minimum bit rate, signal quality information, data compression schemes, etc. This data may also be in any desired ASCII or non-ASCII code since the data is not provided to external devices 10 or 34. Such data can also be used to change the operating parameters of modem engine 17 and the corresponding modem engine in modem 30. It will be appreciated that, initially, modem 11 and modem 30 must use a predetermined data method to communicate. In the preferred embodiment, this predetermined data method is HDLC synchronous communications. Of course, after communications are established, modems 11 and 30 may agree to switch to any other data method available to both modems, such as seven data bit, odd parity, one stop bit asynchronous communications.

When control unit 13 and the corresponding control unit in modem 30 have completed exchanging the desired data, they exchange an end of message signal, which may be, for example, the space-backspace handshake sequence, or an ASCII end of file character, or another desired end of message signal. Once the end of message signal is exchanged, control unit 13 places a logic 0 onto SS conductor 25, and the corresponding control unit in modem 30 does likewise. At this point, external device 10 and external device 34 exchange data through the preferred embodiments 11 and 30 in a conventional manner.

Assume now that modem 30 is a standard modem and that external device 10 and the preferred embodiment 11 are the originating station. Control unit 13, being at the originating station, will place a logic 1 onto SS conductor 25.

When modem 30 detects the ringing signal on telephone line 28 it will answer telephone line 28 and place the answer tone onto telephone line 28. However, modem 30, being a standard modem, will not send the first part of the handshake sequence.

Control unit 13 stores, in memory 27, the response of modem 30 to the originated call. Control unit 13 analyzes the modem 30 response and, if the modem 30 response is not the first part of the handshake sequence, then control unit 13 reads the modem 30 response from memory 27, sends the modem 30 response to external device 10 via switch 14, and then places a logic 0 onto SS conductor 25, thereby connecting external device 10 to modem engine 17. Also if there is no response from modem 30 within a predetermined period of time T2, then control unit 13 places a logic 0 onto SS conductor 25. Control unit 13 then monitors the SOED output of external device 10 and the SOME output of modem engine 17 for an escape sequence, and allows external device 10 to exchange data with external device 34 via modem engine 17 and modem 30 in a conventional manner.

In an alternative embodiment, control unit 13 places a logic 1 onto SS conductor 25 only (1) when sending a part of the handshake sequence, and (2) when exchanging information with the control unit in modem 30 after the handshake sequence has been completed.

The handshaking sequence is not limited to space-backspace. Other combinations of these characters may be used, for example, space-space-backspace-space-backspace-backspace. It will also be appreciated that the null character is self-opposing and nonprintable and may be used. In this case, a handshaking sequence may be space-null-backspace or other combinations of these characters.

Many nonprintable characters are present in the ASCII code. However, most do not have an opposing character. Also, the response to some characters is dependent upon the external device in use and could cause undesired effects, such as going off-line, locking up the external device, etc.

Note that opposing characters, such as space and backspace, must occur in pairs, and that the "forward" character, such as the space (S) character, must precede its paired "reverse" character, such as the backspace (B) character. The reason for this is because external device 10 may be connected to a printer. Assume that the print carriage is at the left margin and the sequence BBBSSS occurs. The print carriage will be unable to respond to the B character, since it is already at the left margin. However, the print carriage will respond to the S characters. Therefore, at the end of the sequence, the print carriage will be three spaces from the left margin. However, the sequences, SSSBBB, SBSBSB, SSBSBB, AND SBSSBB will cause the print carriage to return to its original position.

The null character, of course, may be used without restriction.

It will now be appreciated that a handshake sequence, since it will be passed on to the external device by a standard modem, is subject to these two conditions. It will also be appreciated that the initiate handshake signal SB, and the complete handshake signal SNB, meet these two conditions.

Assume now that the handshake sequence has been completed and control unit 13 is communicating with the corresponding control unit in modem 30. Control unit 13 will have placed a logic 1 onto SS conductor 25. Therefore, the SIED input of external device 10 will be connected by section 14b of switch 14 to the S02 output of control unit 13. Also, as previously stated, the SOED output of external device 10 is connected by conductor 12 to the SI1 input of control unit 13. Therefore, control unit 13 may also communicate with external device 10. In most cases, control unit 13 will have no data to exchange with external device 10, so control unit 13 will place an idle signal on its S02 output.

If external device 10 is an asynchronous device, the idle signal is preferably either a logic 0 or a logic 1. If external device 10 is a synchronous device, the idle signal is preferably a mark flag or an idle flag.

However, in some cases, it may be desirable for the user to be able to review the communications between control unit 13 and the corresponding control unit in modem. In this case, control unit 13 may be instructed, via external device 10, to also send a copy of the communications to external device 10 via its S02 output. Means of construction of a control unit, such as control unit 13, to be responsive to instructions from external device 10 are well known to those skilled in the art.

It will also be appreciated that the data transfer via telephone line 28 may be in either a synchronous or an asynchronous format. In the preferred embodiment 11, if the selected manner of data transfer between external devices 10 and 34 is an asynchronous format, then the handshake sequence will be in that selected asynchronous format. However, if the handshake sequence is completed, then control unit 13 and the corresponding control unit 30 will communicate with each other in a synchronous format.

However, if the selected manner of data transfer between external devices 10 and 34 is a synchronous format, then the handshake sequence and any communications between the control units will also be in that selected synchronous format. It will be appreciated that this feature is advantageous. However, the handshake sequence and any subsequent communications may also be in a selected asynchronous format.

It will be appreciated from the above that control unit 13 has five modes of operation: answer call (originate call); initiate handshake (complete handshake); control unit communications; external device communications; and command. It will also be appreciated that the answer call (originate call), external device communication, and command modes are typical of standard modems. The external device communications mode is often referred to as the on-line mode.

In an alternative embodiment of the present invention, SS conductor 25 comprises two conductors, and sections 14a and 14b of switch 14 are controlled independently. In this embodiment section 14a connects conductors 15 and 16 only when control unit 13 is sending data to modem engine 17, and section 14b connects conductors 21 and 22 only when control unit 13 is sending data to external device 10. In this embodiment, external device 10 will receive any data sent from or by modem 30, including the part of the handshake sequence sent by modem 30 and any control unit-to-control unit information sent by modem 30.

As previously discussed, the handshake sequence comprises opposing, nonprintable characters and therefore has no effect on external device 10. In order to prevent the control unit-to-control unit information from affecting external device 10, this information is provided in the form of opposing, nonprintable characters. For example, the letter "A" may comprise the sequence SSSNBBB, where S is the ASCII space character, N is the ASCII null character, and B is the ASCII backspace character; the letter "B" may comprise the sequence SSNSBBB, and so on.

It will be appreciated that this method requires more time to transfer the information, and also causes the cursor on a CRT screen, or the carriage on a printer, to move back and forth. However, this method may be desirable in cases where, to provide information to the user that the connection has been made, the CRT screen or printer carriage does something, as opposed to nothing, while the control unit-to-control unit information transfer is occurring.

Although the above embodiment and handshaking sequence have been described with respect to operation in a modem, it will be appreciated that they are not limited to modems. For example, an external device 10 may use this invention to determine whether another external device 34 is of the same type as external device 10. If so, external device 10 and external device 34 may exchange other information which need not or should not be presented to the user, such as the data compression scheme to be used, additional log-on identification or protocols, etc.

Since many other variations and embodiments of the present invention may suggest themselves to those skilled in the art based upon the foregoing disclosure, the present invention is to be limited only by the claims below.

I claim:

1. In a method of operating a first data communications device to establish communication between said first data communications device and a second data communications device, which includes the step of said first and second data communications devices establishing data communications in a first predetermined communications mode, a method of testing said second data communications device for an ability to communicate in a second predetermined data communications mode, comprising the steps of:
   (a) causing said first data communications device to transmit a first predetermined set of one or more data words in said first predetermined data communications mode, said data words in said first predetermined set each corresponding to nonprinting characters;
   (b) causing said first data communications device to respond to subsequent receipt of a second predetermined set of data words by switching to operation in said second predetermined data communications mode; and
   (c) alternatively causing said first data communications device to remain in said first predetermined data communications mode in response to subsequent receipt of one or more data words which are not part of said second predetermined set of data words.

2. The method of claim 1 wherein:
said first predetermined data communications mode is an asynchronous communications mode and said second predetermined data communications mode is a synchronous communications mode.

3. The method of claim 2 wherein:
each of said data words in said first predetermined set of data words is selected from the group consisting of ASCII characters space, backspace, and null.

4. In a modem of the type including apparatus for handshaking according to a predetermined protocol to establish data communications with a remote data communications device in a first predetermined data communications mode of operation, and apparatus for selectively causing said modem to communicate in a second predetermined data communications mode of operation, the improvement comprising in combination:
   means operable when said modem is in an answer mode in said first predetermined data communications mode of operation to transmit a first predetermined set of data words corresponding to nonprinting characters in response to initial establishment of said first predetermined data communications mode of operation with said remote data communications device;
   receiving means for detecting received data words from said remote data communications device; and
   control means responsive to a predetermined number of the first ones of said received data words to be detected subsequent to transmission of said first predetermined set of data words for causing said modem to switch to said second predetermined data communications mode of operation in response to said first ones of said received data words matching a second predetermined set of data words and, alternatively, for causing said modem to remain in said first predetermined data communications mode of operation in response to said first ones of said received data words failing to match said second predetermined set of data words.

5. A modem as recited in claim 4 wherein:
said control means is further responsive to said first ones of said received data words failing to match said second predetermined set of data words to transmit said first ones of said received data words to a data utilization device connected to said modem.

6. A method os handshaking between a first modem and a second modem, comprising:
a first modem procedure, comprising:
(a) sending a first predtermined sequence of nonprinting characters to said second modem;
(b) listening for a second predetermined sequence of nonprinting characters from said second modem; and
(c) if said second predetermined sequence has been sent by said second modem, entering a first operating mode, and, alternatively, if said second predetermined sequence has not been sent by said second modem, entering a second operating mode; and
a second modem procedure comprising:
(d) listening for said first predetermined sequence from said first modem; and
(e) if said first predetermined sequence has been sent by said first modem, sending said second predetermined sequence to said first modem and entering said first operating mode, and, alternatively, if said first predetermined sequence has been sent by said first modem, entering said second operating mode.

7. The method of claim 6 wherein said forst predetermined sequence comprising a space character and a backspace character.

8. The method of claim 7 wherein said first predetermined sequence further comprises a null character.

9. The method of claim 7 wherein said second predetermined sequence comprises said character and said backspace character.

10. The method of claim 9 wherein said second predetermined sequence further comprises a null character.

11. The method claim 10 wherein said first predetermined sequence further comprises said null character.

12. The method of claim 6 wherein said first operating mode comprises sending control information.

13. The method of claim 12 wherein said control information comprises data compression schemes available.

14. The method of claim 12 wherein said control information comprises designation of a data compression scheme to be used.

15. The method of claim 12 wherein said control information comprises designation of asynchronous communications or synchronous communications.

16. In am odem of the type including apparatus for handshaking according to a predetermined protocol to establish communications in a first operating mode with a remote modem, the improvement comprising:
means operable when said modem is in first operating mode to transmit a first predetermined sequence of nonprinting characters to said remote modem;
receiving means for detecting a second predetermined sequence of nonprinting characters from said remote modem; and
control means responsive to detection of said second predetermined sequence for causing said modem to switch to a second operating mode wherein said modem and said remote modem may exchange control information and, alternatively, responsive to a lack of detection of said second predetermined sequence for causing said modem to remain in said first operating mode.

17. The improvement of claim 16 wherein said first predetermined sequence comprises a space character and a backspace character.

18. The improvement of claim 17 wherein said first predetermined sequence further comprises a null character.

19. The improvement of claim 17 wherein said second predetermined sequence comprises said space character and said backspace character.

20. The improvement of claim 19 wherein said second predetermined sequence further comprises a null character.

21. The improvement of claim 20 wherein said first predetermined sequence further comprises sain null character.

22. The improvement of claim 16 wherein said control information comprises the data compression schemes available.

23. The improvement of claim 16 wherein said control information comprises a data compression scheme to be used.

24. The improvement of claim 16 wherein said control information comprises selection of asynchronous communications and synchronous communications.

25. In a modem of the type including apparatus for handshaking according to a predetermined protocol to establish communications in a first operating mode with a remote modem, the improvement comprising:
receiving means for detecting a first predetermined sequence of nonprinting characters;
transmitting means tranmitting a second predetermined sequence of nonprinting charactes; and
control means responsive to detection of said first predetermined sequence for causing said transmitting means to send said second predetermined sequence and for causing said modem to switch to a second operating mode wherein said modem and said remote modem may exchange control information and, alternalively, responsive to a lack of detection of said first predetermined sequence for causing said modem to remain in said first operating mode.

26. The improvement of claim 25 wherein said first predetermined sequence comprises a space character and a backspace character.

27. The improvement of claim 26 wherein said first predetermined sequence further comprises a null character.

28. The improvement of claim 26 wherein said second predetermined sequence comprises said space character and backspace character.

29. The improvement of claim 28 wherein said second predetermined sequence further comprises a null character.

30. The improvement of claim 29 wherein said first predetermined sequence further comprises said null character.

31. The improvement of claim 25 wherein said control information comprises the data compression schemes available.

32. The improvement of claim 25 wherein said control information comprises a data compression scheme to be used.

33. The improvement of claim 25 wherein said control information comprises selection of asynchronous communications and synchronous communications.

* * * * *